US010688908B2

(12) United States Patent
    Bean

(10) Patent No.: US 10,688,908 B2
(45) Date of Patent: *Jun. 23, 2020

(54) SECURING ASSEMBLY

(71) Applicant: David Robin Bean, New South Wales (AU)

(72) Inventor: David Robin Bean, New South Wales (AU)

(73) Assignee: 123LASH Pte LIMITED, Marina Bay (SG)

( * ) Notice: Subject to any disclaimer, the term of this patent is extended or adjusted under 35 U.S.C. 154(b) by 50 days.

This patent is subject to a terminal disclaimer.

(21) Appl. No.: 15/686,189

(22) Filed: Aug. 25, 2017

(65) Prior Publication Data
    US 2018/0072215 A1    Mar. 15, 2018

Related U.S. Application Data

(62) Division of application No. 14/764,400, filed as application No. PCT/AU2014/000053 on Jan. 29, 2014, now Pat. No. 9,744,898.

(30) Foreign Application Priority Data

Jan. 29, 2013  (AU) ................... 2013900266
Jul. 11, 2013  (AU) ................... 2013902563

(51) Int. Cl.
    *B60P 7/08*    (2006.01)
    *B63B 25/00*   (2006.01)
    (Continued)

(52) U.S. Cl.
    CPC .................. *B60P 7/08* (2013.01); *B60P 7/10* (2013.01); *B60P 7/13* (2013.01); *B60P 7/18* (2013.01);
    (Continued)

(58) Field of Classification Search
    CPC ...... B60P 7/08; B60P 7/13; B60P 7/10; B63B 25/28; B63B 2025/285; B63B 25/00;
    (Continued)

(56) References Cited

U.S. PATENT DOCUMENTS 1,974,686 A    9/1934  Meyercord
2,205,273 A    6/1940  Radey
(Continued)

FOREIGN PATENT DOCUMENTS

DE    39 39 225 A1    5/1991
DE    10108519 A1     9/2002
(Continued)

OTHER PUBLICATIONS

PCT Search Report, dated Apr. 16, 2014.
(Continued)

*Primary Examiner* — Stephen T Gordon
(74) *Attorney, Agent, or Firm* — Dority & Manning, P.A.

(57) ABSTRACT

A securing assembly is adapted to secure objects to a structure. The assembly includes an attachment mechanism adapted to attach the assembly to an object in use. An elongate rod has a first end and a second end, wherein the first end is connectable to the attachment mechanism and the second end is connectable to an adjustment device. A base is adapted to connect the adjustment device to the structure in use. The adjustment device is operable to adjust a tension between the object and the structure by way of the assembly to secure the object to the structure in use.

19 Claims, 20 Drawing Sheets

(51) Int. Cl.
  *B65D 88/12* (2006.01)
  *B63B 25/28* (2006.01)
  *B60P 7/13* (2006.01)
  *B61D 3/20* (2006.01)
  *B60P 7/18* (2006.01)
  *B61D 45/00* (2006.01)
  *B60P 7/10* (2006.01)

(52) U.S. Cl.
  CPC .............. *B61D 3/20* (2013.01); *B61D 45/007* (2013.01); *B63B 25/00* (2013.01); *B63B 25/002* (2013.01); *B63B 25/004* (2013.01); *B63B 25/28* (2013.01); *B65D 88/12* (2013.01); *B65D 88/121* (2013.01); *B65D 88/129* (2013.01); *B63B 2025/285* (2013.01)

(58) Field of Classification Search
  CPC ..... B63B 25/004; B63B 25/002; B65D 88/12; B65D 88/121; B65D 88/129; B61D 45/007; B61D 3/20
  USPC ............. 410/68, 77, 80, 85, 96–97, 100, 81; 114/75
  See application file for complete search history.

(56) References Cited

U.S. PATENT DOCUMENTS

| | | |
|---|---|---|
| 2,587,094 A | 2/1952 | Berg |
| 3,140,850 A | 7/1964 | Packard |
| 3,229,952 A | 1/1966 | Zumbo |
| 3,679,176 A | 7/1972 | Campbell |
| 4,171,122 A | 10/1979 | Munsch et al. |
| 4,249,840 A * | 2/1981 | Kallaes ...................... B60P 7/13 410/84 |
| 5,012,879 A | 5/1991 | Bienek |
| 6,666,633 B2 | 12/2003 | Hsieh |
| 6,758,643 B1 * | 7/2004 | Hsieh ...................... B63B 25/28 410/100 |
| 7,101,130 B2 * | 9/2006 | Hsieh ................... F16B 21/165 410/100 |
| 9,744,898 B2 * | 8/2017 | Bean ....................... B63B 25/28 |
| 2003/0215300 A1 | 11/2003 | Hsieh |
| 2006/0115350 A1 | 6/2006 | Weis |

FOREIGN PATENT DOCUMENTS

| | | |
|---|---|---|
| WO | WO 2005/032929 A1 | 4/2005 |
| WO | WO 2007/100315 A2 | 9/2007 |

OTHER PUBLICATIONS

Supplementary European Search Report, dated Jun. 29, 2016.
Singapore Search Report, dated Jun 23, 2016.
Chinese Search Report, dated Aug. 31, 2016.

* cited by examiner

SECURING ASSEMBLY

RELATED APPLICATIONS

The present application is a Divisional Application of U.S. application Ser. No. 14/764,400, filed Jul. 29, 2015, which is a 371 application of PCT/AU2014/000053, filed Jan. 29, 2014, which claims priority to AU 2013900266, filed Jan. 29, 2013, and AU 2013902563, filed Jul. 11, 2013.

FIELD OF THE INVENTION

The present invention relates to a securing assembly and in particular to an assembly to secure objects to a structure.

BACKGROUND OF THE INVENTION

Thousands of objects are transported around the world every day. Most such objects are packaged before transport and grouped together to form larger objects to be placed on or in pallets, shipping containers or the like. Those larger objects are then transported from one place to another by moving means such as planes, trains, trucks, ships or the like. When such objects are being transported, in particular over long distances, the objects may become dislodged due to movement in transit. The object if dislodged may break or be damaged which is undesirable. Accordingly, it has become necessary to secure the objects to a fixed structure, such as the deck of a ship, flatbed of a truck or the like, during transit.

Referring particularly, but not exclusively to shipping, it is common to transport objects in shipping containers. To inhibit movement during transit, a lashing system is typically used to secure shipping containers to the deck of the ship. This helps limit movement of the containers as the ship rolls about during sailing. Lashing systems stabilise the lower rows of containers so that other containers may be stacked on top.

There are however many problems with the existing lashing methods and devices. For example, in most container ports more than 30% of injuries are related to the task of lashing. Lashing workers are performing heavy, awkward work, frequently on an exposed, often slippery deck. The environment is constantly changing, difficult to supervise and dangerous. A delay between the time a ship arrives and the time of the first container being unloaded is an issue for ship owners. This is often due to the time taken to unlash enough containers before the crane can start work safely to unload the containers. The pressure to get containers unlashed therefore results in hurrying and frequently in injury and even death. There is similar (and possibly greater) pressure to complete lashing after the last container is loaded so the ship can set sail on time.

Lashing equipment is by its nature quite heavy. Existing systems can include a rod assembly weighing upwards of 24 kg. This weight combined with a rods length and shape makes them awkward to handle. To make the task more manageable recently components have been designed to be disconnected so that smaller sub-assemblies can be handled one at a time. This results in a process where the majority of the physical effort and time is related to handling lashing components. Also with existing lashing equipment container height and ship variability is not considered. Containers are of different heights. The lashing therefore needs to be adjusted to suit each combination of containers.

Also International guidelines require that lashing is assembled using at least two workers. This adds to the ship owners cost and while reducing the chance of strain through overloading a worker, adds to the risk of one worker striking another by accident in a space constrained deck. This is made worse by the need for the lashing rods to be attached in a way that allows associated turnbuckles to be rotated. This extra clearance requires the rods to be set out at an angle from the container face. The deck on many ships becomes cluttered by lashing encroaching on walkways. The accepted minimum for walkways is now 750 mm between container faces. This is to provide sufficient room for workers to perform tasks. By contrast in some ships the lashing is attached in such a way that the workers must lean across to handle the lashing, increasing the chance of back strain and also of losing balance and causing an accident.

After removal, the lashing is generally stored on deck. In some ships this is done neatly in dedicated bins and racks, in others it results in bars being stored on walkways creating slip and trip hazards. The deck environment and location is not conducive to good maintenance. Lashing should be regularly checked and lubricated. On many ships this results in poorly maintained bars (bent, rusted, worn etc). Removal of a faulty component results in an awkward and physically arduous process to remove and replace the component. The result of this is that faulty or suspect equipment remains in service when it should be removed for repair/replacement. Lashing plans (the number and position of lashings bars) is varied depending on load and expected weather. The high workload of attaching lashing means that ship owners and stevedores seek to use the minimum amount of lashing. This in itself is not a problem but when extra lashing is required (e.g. bad weather expected) it results in a need to carry extra lashing up onto the deck (either up a ladder or even passing the bars around the outside of the ship) this is heavy and difficult work. In some cases where conditions change it can result in the crew having to do this while at sea which is extremely dangerous.

As mentioned above typical lashing is tensioned by use of a bottle screw (or turnbuckle). These turnbuckles are large and heavy, frequently are difficult to turn and require special locking devices to prevent the lashing loosening due to rotation of an adjuster. As the ship travels and the loads shift the turnbuckles may be subjected to high forces (they have a 24 Tonne working load). Frequently this results in the thread of the turnbuckle "locking" which requires the stevedore to use a prise bar or the like to release the tension on the lashing rod. This process can affect turnbuckle thread life but more importantly leads to dangerous acts of striking and forcing followed by a sudden movement of the turnbuckle. This in turn can lead to off-balance falls, striking injuries and it is not uncommon for prise bars to fly off the turnbuckle when pushed or struck.

It is known that lashing is meant to be set with no slack but minimal tension. Excessive tension merely loads the container in a vertical direction leading to reduced load capacity or failure of a container due to excessive loading. Containers are regularly lost overboard through "stack collapse" with over tensioned lashing being a known contributor. Some lashing systems include a short tensioning spanner to try and restrict over tensioning but stevedores are known to use prise bars in their work which can over load the fittings. In addition, the tension applied is highly subjective with no real objective standard for knowing what is a "correct" tension. Once lashing is set it is generally required that it be rechecked after 24 hours at sea and also before encountering heavy weather. This can be a difficult task. Some manufacturers provide "quick slack removers" but these do not adequately address tension. The whole issue of compliance to re-tensioning requirements is almost impossible to validate. Even if a ship's captain is diligent in requiring crew to check lashing, they have little or no objective evidence that it has been done correctly (or at all) the same issue arises for owners and insurers. Quality assurance on lashing is almost non-existent.

In summary, existing lashing is difficult to individually identify or check. This leads to situations where the age and service life of a component is not known and a "fix on fail" style of repair is used. This can lead to failure in service and potentially risk to cargo, ships and workers. Turnbuckles are frequently over greased as well. This can lead to excessive grease covering workers and getting on the deck resulting in a very slippery floor and a hazardous workplace. It is also readily transferred to other equipment and handrails making them slippery and potentially dangerous. Current lashing bars are designed to hook into the corner casting of a container and then "lock in" when rotated into the operating position. A frequent issue is when a bar is "hung" temporarily. If the bar is touched or knocked it can readily fall out. Although hanging bars are not encouraged in many ports it occurs frequently and results in striking injuries. The current need to lower the long rods to the deck represents a constraint on how close together teams can work together. Adding extra workers to the lashing task regularly results in higher levels of adverse interaction between teams. This often takes the form of a worker from one team inadvertently striking or impeding workers form another team.

Accordingly there is a need to greatly reduce the amount of time and effort required to load and unload objects from structures such as the decks of ships. There is also a need to reduce the chance of injury to workers loading and unloading objects onto and off those structures.

OBJECT OF THE INVENTION

It is an object of the invention to substantially overcome or at least ameliorate one or more of the disadvantages of the prior art, or at least to provide a useful alternative.

SUMMARY OF THE INVENTION

There is disclosed herein a securing assembly adapted to secure objects to a structure, the assembly including:

attachment means adapted to attach said assembly to an object in use;

an elongate rod, the rod having a first end and a second end, the first end connectable to the attachment means, the second end connectable to an adjustment means;

a base adapted to connect said adjustment means to said structure in use, whereby said adjustment means is operable to adjust a tension between said object and said structure by way of said assembly to secure said object to said structure in use.

Preferably, said base includes a slide mechanism to permit said base to be moved about said structure.

Preferably, said slide mechanism includes a slide moveable along a track securable on said structure.

Preferably, said base includes a lock, to lock said base in a position about said structure.

Preferably, said lock includes a pin.

Preferably, said base includes a release mechanism to disconnect said assembly from said structure.

Preferably, said second end of said rod includes a threaded portion, said threaded portion operatively associated with a corresponding threaded portion on said adjustment means to adjust a length of said rod.

Preferably, said adjustment means includes a pair of arms separated by a bridging portion.

Preferably, said arms form a diamond shape.

Preferably, said bridging portion in use is adjustable to change the shape of said diamond to tension said assembly.

Preferably, said assembly includes two or more rods, each said rod having corresponding attachment means to permit said assembly to secure two or more objects to a structure.

Preferably, said attachments means includes a hook adapted to connect with a corner of a shipping container.

Preferably, said hook includes means to retain said hook in said container corner.

Preferably, the said base includes means adapted to move a lower section of the rod at an angle to the object to tension the elongate rod.

In an alternative version of the invention the adjustment means is oriented to be axial to the rod.

Preferably, said base is adapted to attach to one or more existing fittings of the structure.

Preferably, said rod is adapted to remain attached to said adjustment means.

Preferably, said adjustment means includes a sliding element having a thread.

Preferably, said adjustment means can be operated manually or by way of an automatic adjusting device.

Preferably, said adjusting device is able to load the adjustment means to a pre-determined tension.

Preferably, said adjusting device is provided with an identification means to provide automatic identification at the time of the tensioning operation to thus identify which rod is being adjusted.

Preferably, said adjusting device includes sensors to confirm whether adjustment has been achieved and at what tension.

Preferably, said adjustment device includes a means of communicating that an adjustment desired tension has been reached.

Preferably, the adjustment device includes a means of warning a user that the adjustment means has failed to achieve the desired tension.

Preferably, said adjustment device includes a means of communicating a tension status to third parties via external communications means.

Preferably, said communications can be stored and reused by third parties for the purpose of providing reports and warnings.

Preferably, the adjustment device includes a mechanism for quick adjustment to provide coarse adjustment without requiring excessive use.

Preferably, the adjustment device includes a "quick detensioning" device to release a force on the rod.

BRIEF DESCRIPTION OF THE DRAWINGS

A preferred embodiment of the invention will now be described, by way of an example only, with reference to the accompanying drawings wherein.

DETAILED DESCRIPTION OF THE PREFERRED EMBODIMENTS

Referring to the figures there is disclosed an assembly 1 to secure objects 2 to a structure 3 such as a deck of a ship. The assembly 1 includes physical hardware and equipment for manipulating the hardware and processes for exploiting the equipment and hardware. The physical hardware consists of a lashing harness 1 that is designed to remain intact when transported, maintained and stored.

Figure 7:
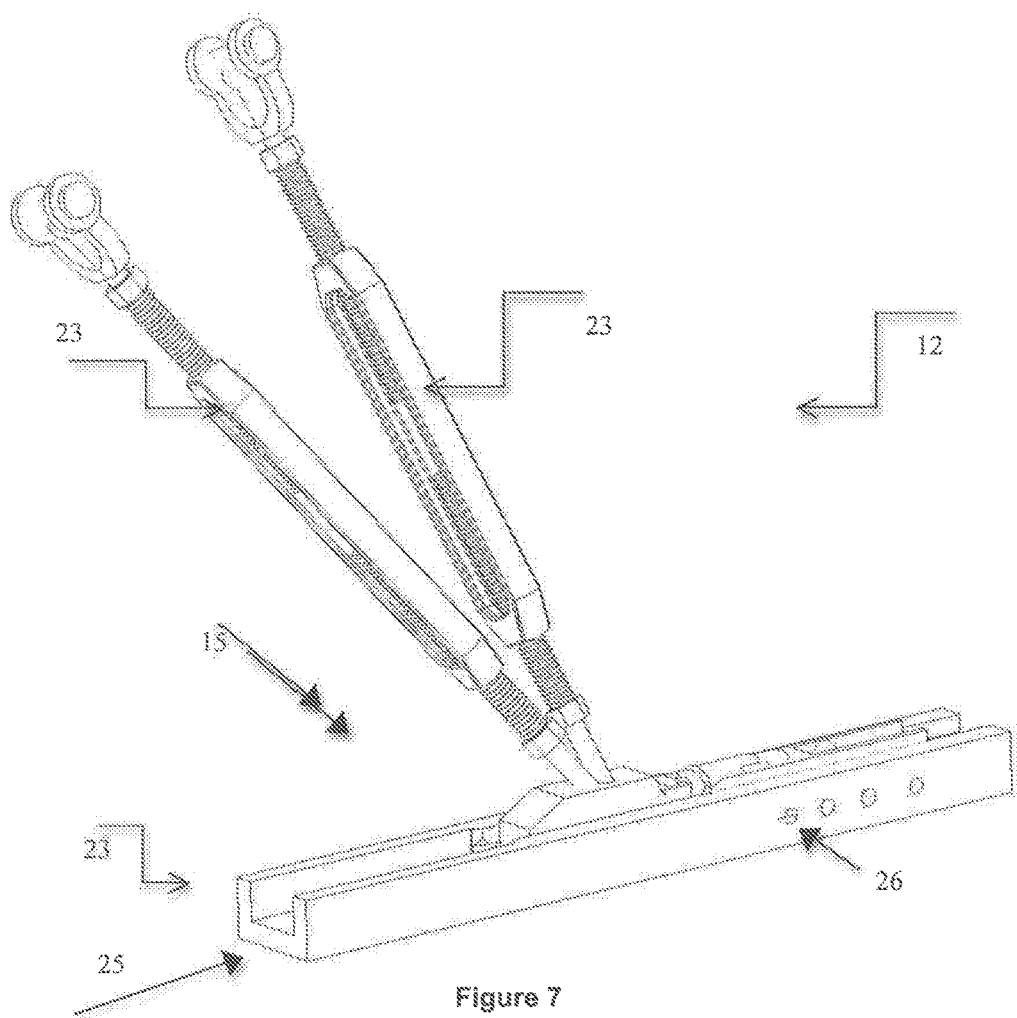
FIG. 7 is an embodiment of a slide of the present invention.
Figure 8:
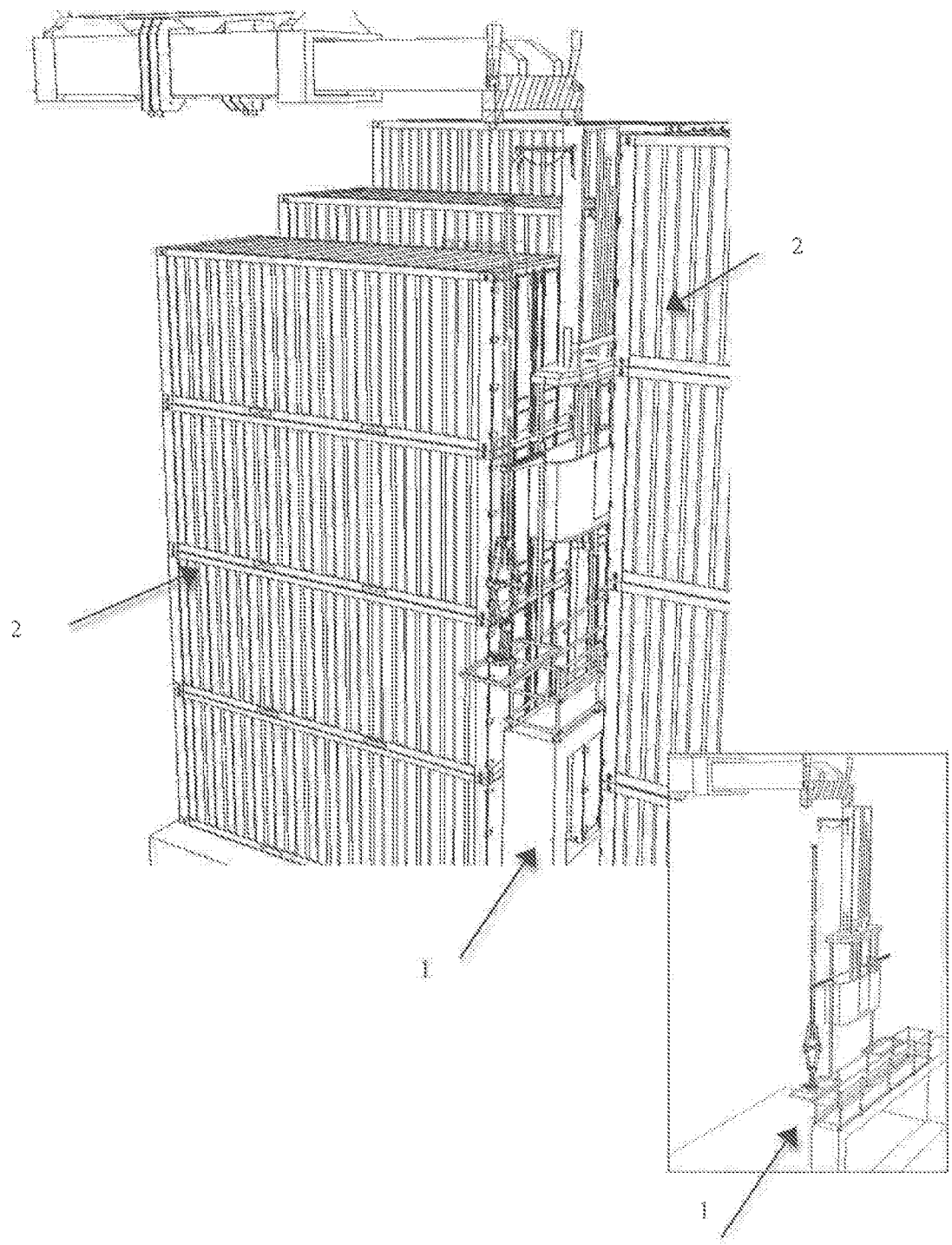
FIG. 8 is an embodiment of a securing assembly of the present invention in situ.
Figure 9:
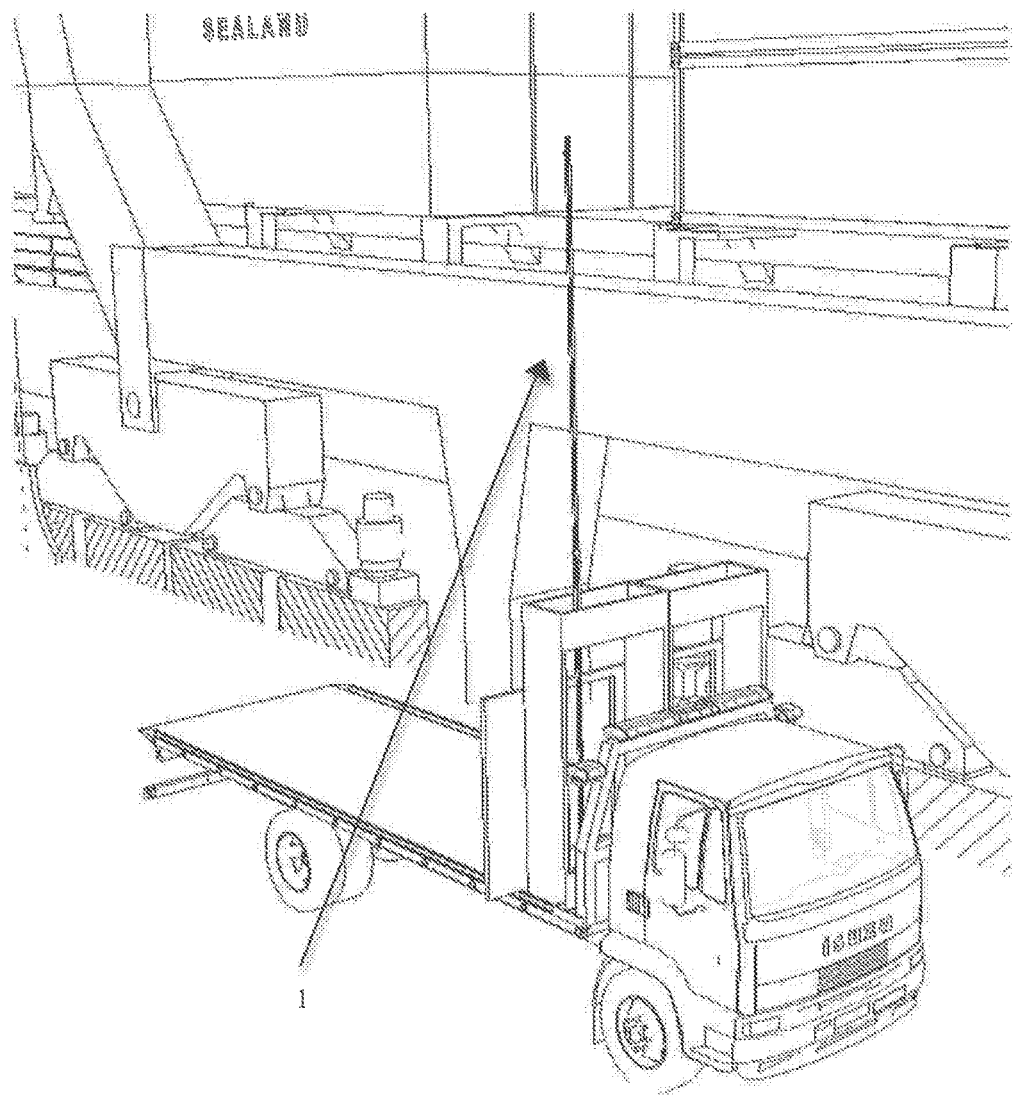
FIG. 9 is an embodiment of a securing assembly of the present invention in situ.

The assembly 1 includes attachment means 5 adapted to attach said assembly 1 to an object 2 in use. An elongate rod 6 has a first end 6a and a second end 6b. The first end 6a is connectable to the attachment means 5. The second end 6b is connectable to an adjustment means 10. A base 12 is adapted to connect said adjustment means 10 to said structure 3 in use. The adjustment means 10 is operable to adjust a tension between said object 2 and said structure 3 by way of said assembly 1 to secure said object 2 to said structure 3 in use. The base 12 as best seen in FIG. 7 includes a slide mechanism 15 to permit said base 12 to be moved about said structure 3. Preferably, the slide mechanism 15 includes a slide 20 moveable along a track 21 securable on said structure 3. A series of turnbuckles 23 or the like connect the slide 20 to the adjustment means 10. Preferably, the base 12 includes a lock 25, to lock said base 12 in a position about said structure 3. The lock 25 in a preferred form includes a pin 26.

Figure 6:
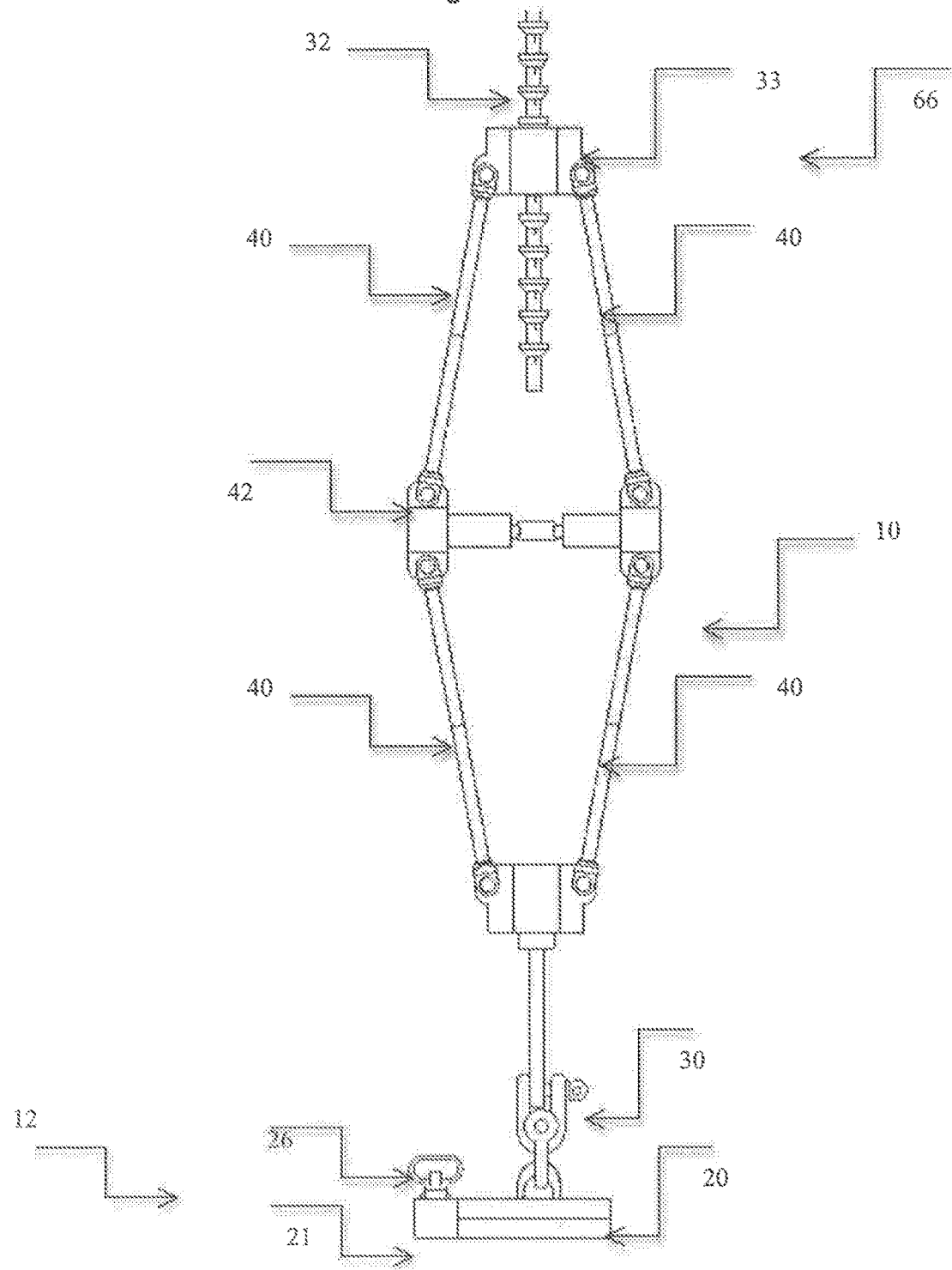
FIG. 6 is a partial detailed view of FIG. 1.

As best seen in FIG. 6, the base 12 includes a release mechanism 30 to disconnect said assembly 1 from said structure 3. The second end 6b of said rod 6 includes a threaded portion 32. The threaded portion 32 is operatively associated with a corresponding threaded portion 33 on the adjustment means 10 to adjust a length of the rod 6 in use. The adjustment means 10 includes a pair of arms 40 separated by a bridging portion 42. The arms 40 in a preferred embodiment form are a diamond shape. The bridging portion 42 in use is adjustable by altering a distance between arms 40 to change the shape of the diamond to tension the assembly 1.

Figure 5:
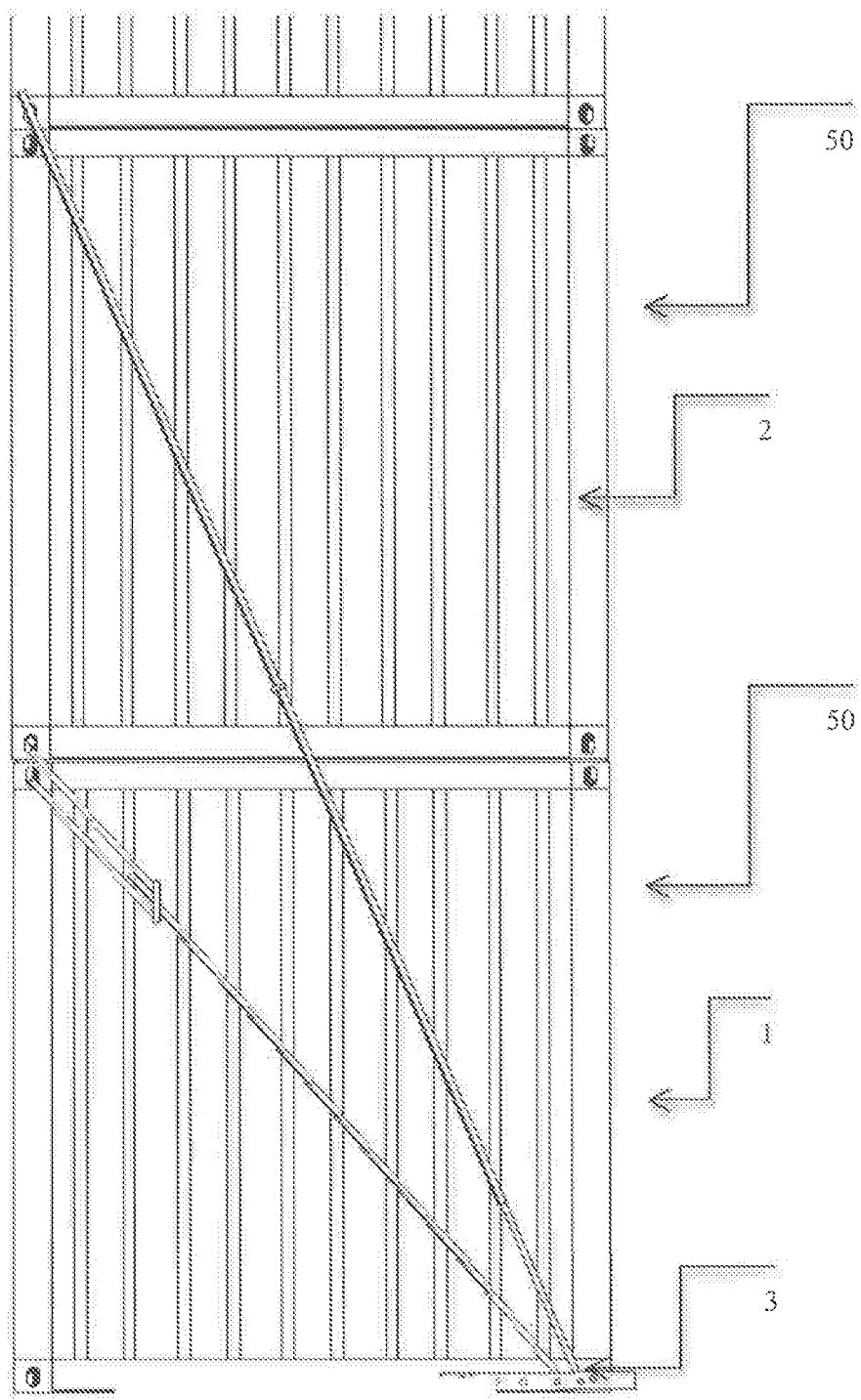
FIG. 5 shows FIG. 2 in situ.

The assembly in a preferred embodiment includes two or more rods 6. Each said rod 6 having corresponding attachment means 5 to permit said assembly 1 to secure two or more objects 2 to a structure 3 as best seen in FIG. 5.

Figure 1:
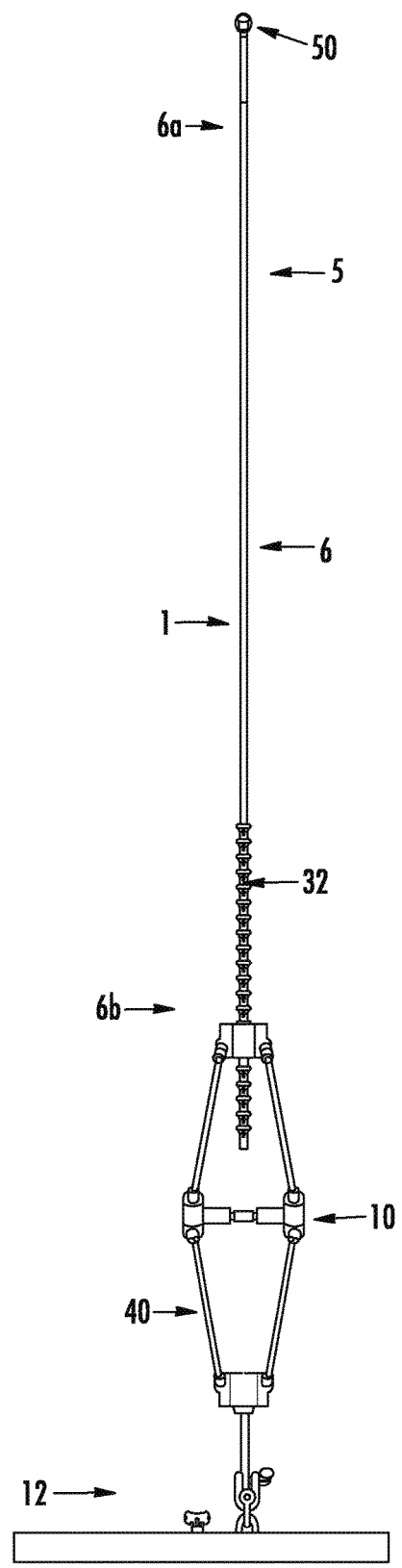
FIGS. 1 and 1a are embodiments of a securing assembly of the present invention.
Figure 1A:
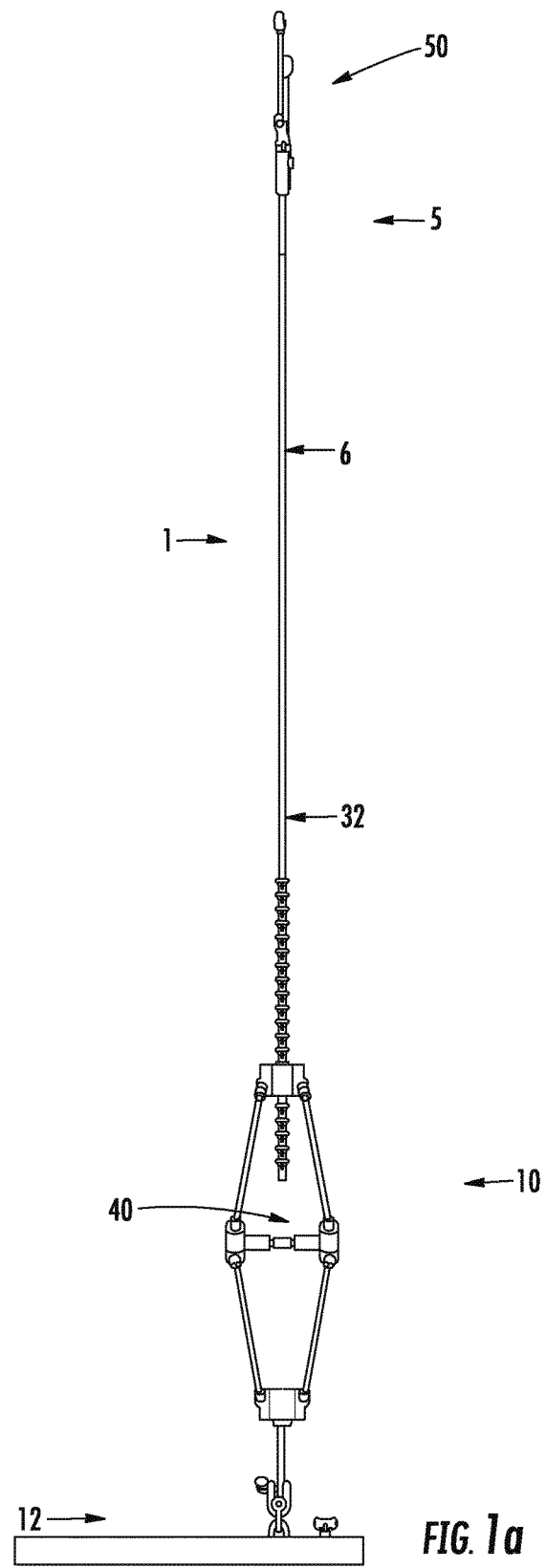
Figure 2:
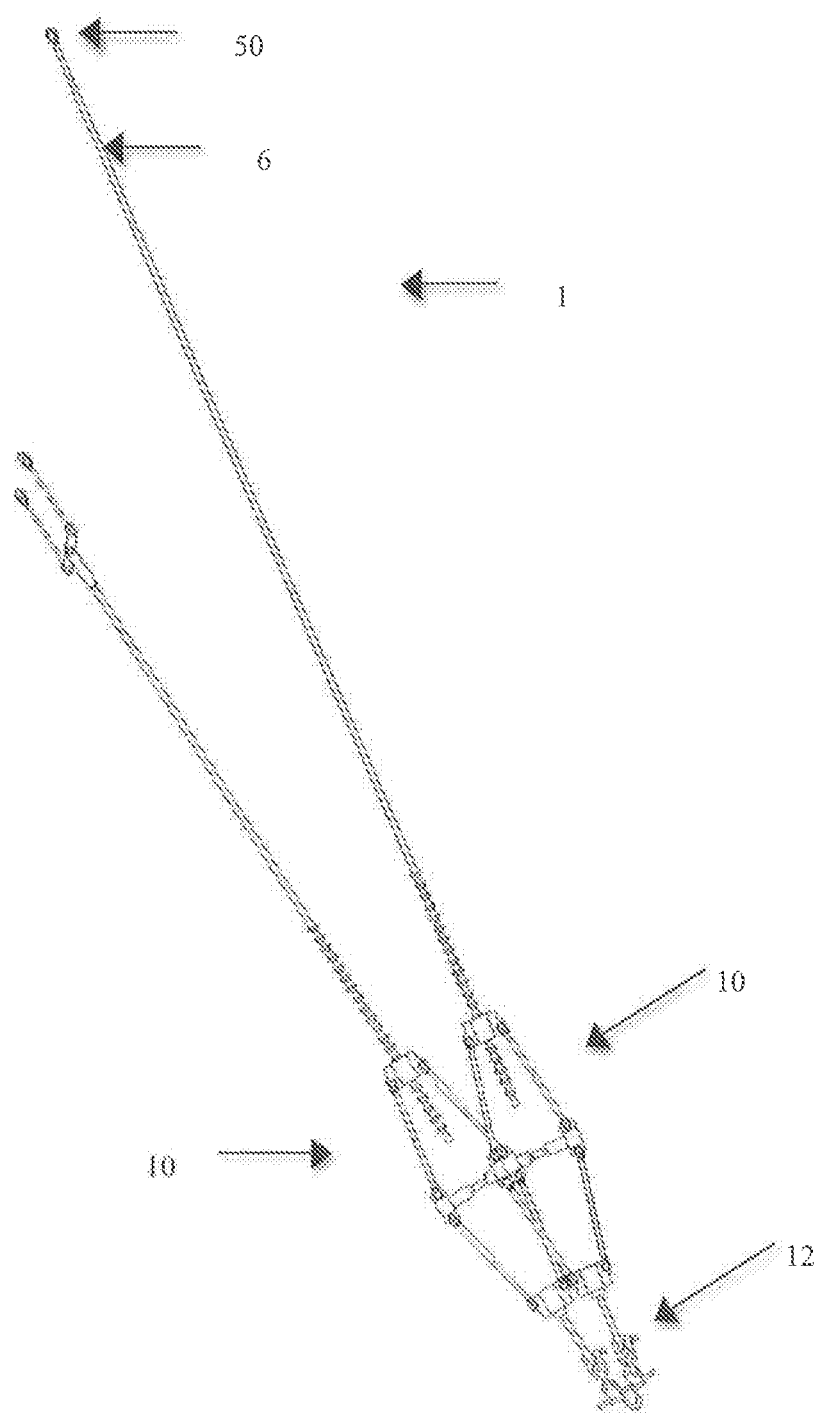
FIG. 2 is another embodiment of a securing assembly of the present invention.
Figure 3:
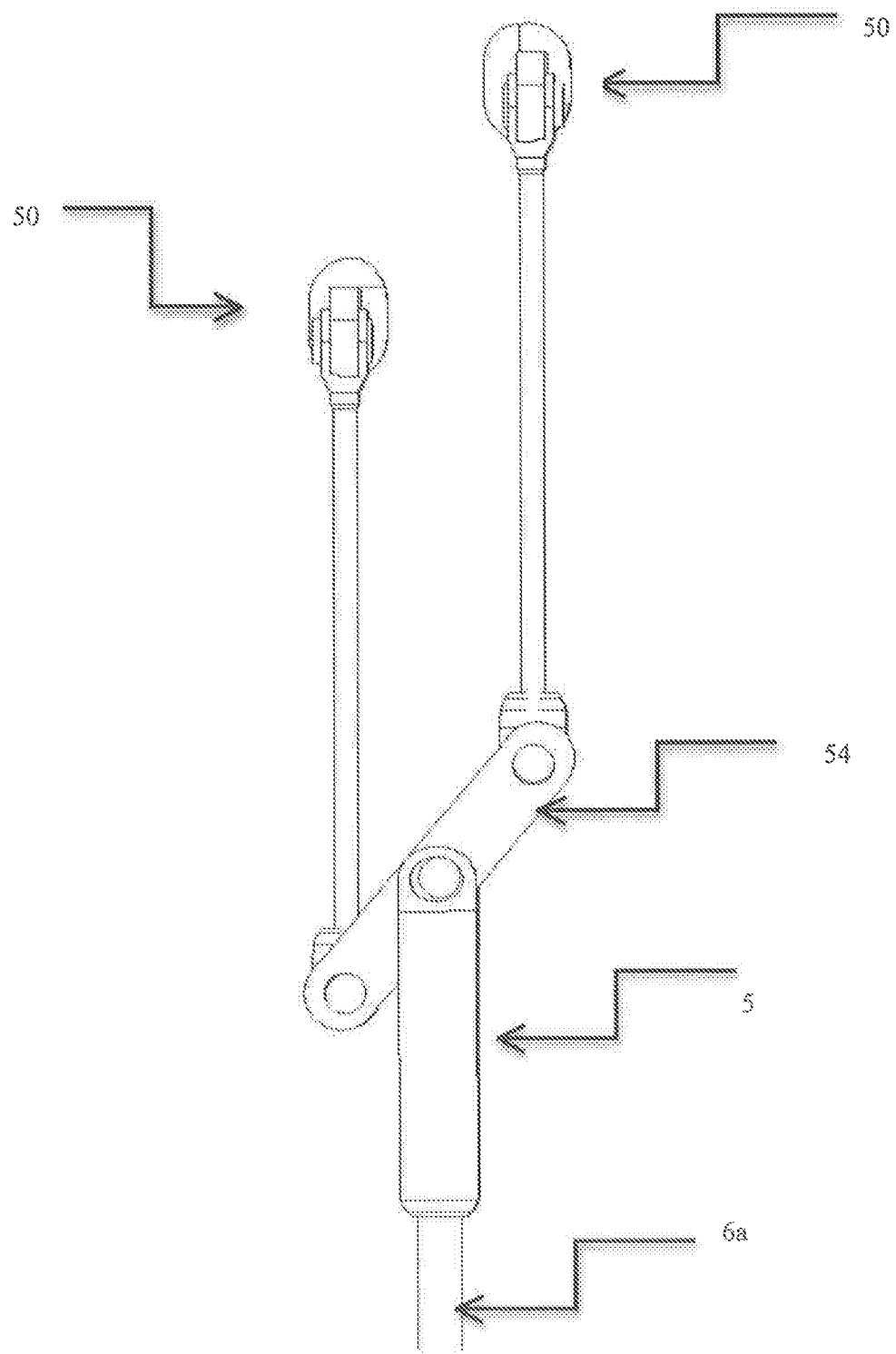
FIG. 3 is an embodiment of the hook arrangement of the present invention.
Figure 4:
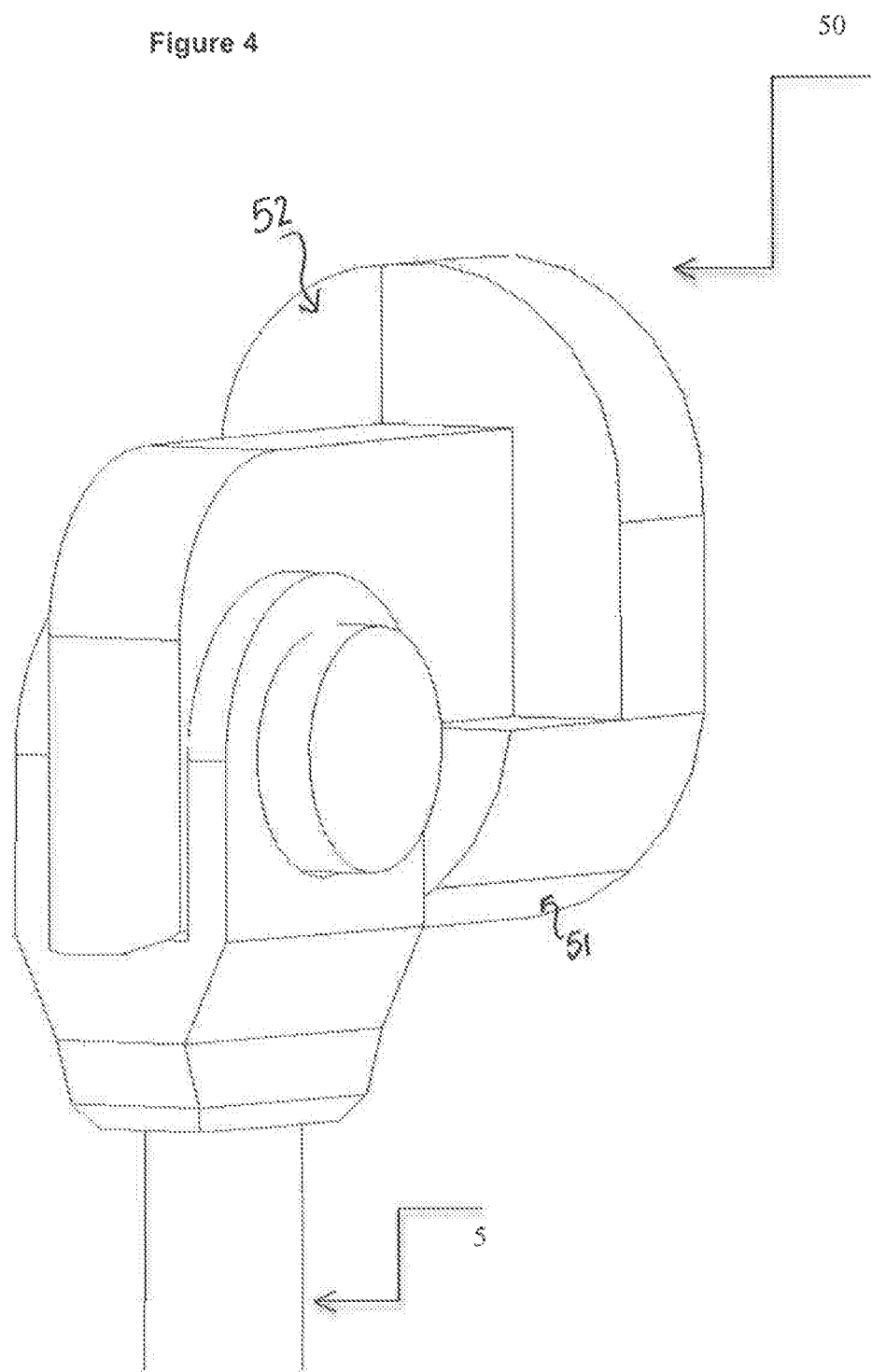
FIG. 4 is another embodiment of the hook arrangement of the present invention.

As shown in FIGS. 1, 1a and 4, the attachment means 5 includes a hook 50 adapted to connect with a corner of a shipping container 2 or the like. In FIG. 1 a single hook or head is shown. In FIG. 2 a double hook or head is shown. As seen in FIG. 4, the hook 50 includes head 51 and means 52 to retain the hook 50 in the container corner. As shown in FIG. 3, an adjuster 54 can be used to alter the locations of the hooks 50.

In a preferred embodiment the harness assembly 1 consists of attachment means 5 in the form of a hanging hook 50 that connects in use with a standard ISO (or similar) container 2 to transmit force from that container 2 to a structure. The hook 50 including the retainer means or device 52 prevents the hook 50 from falling out of the corner socket when in the vertical position. The retainer 52 could be a positive lock or a detent style device or the like. On versions of the hook 50 which are designed to work in parallel units, the head 51 is shaped such that it allows the rods 6 to hang vertically. This can be done by offsetting the hanging position or allowing the bar 6 to move relative to the head 51 to clear the head 51 of the lower parallel. The elongated bar 6 transmits the load from the hook 50 to the optional adjuster 54 which adjusts for length. A "quick connect" attachment 30 from the harness 1 to the ship (either deck, lashing bridge or some other structure) is also provided.

The equipment consists of; a device for supporting the hardware while it is being attached to the container, a device for transporting the hardware from the ship for further processing, a device to allow the hardware to be handled safely when off the ship, a device for setting the correct length of the hardware so that it is ready for its next use (length robot) not illustrated, and a device for tensioning the hardware to a set level (Motorised adjuster) not illustrated. The equipment also includes a device for supporting and storing the hardware aboard the ship.

The processes consists of a process for quick disconnection of the hardware from the ship, leaving it hanging safely from the container to which it is attached; a process for removing the hardware from the container that requires little or no manual effort from the operator. This process may be mechanically assisted or could be fully automated. A process for loading the hardware onto equipment designed for carrying it to another location (elsewhere on the ship, other vessel, on land, truck or the like). A process for rapidly maintaining the hardware. A process for rapidly and accurately setting the length of the hardware to be ready for its next use. A process for accurately tensioning the hardware to a set level. A process for recording and reporting the outcome of the process mentioned above.

The alternate process consists of a means for quickly disconnecting the equipment from the attachment means 5 on or about the deck lashing bridge or hatch cover; the upper end 6a remains connected to the container 2 while the lower end 6b is swung across from the attachment means 5 to a support/bracket. The end is secured to this bracket. The equipment is then lifted slightly (by direct operator effort or by use of a lifting device (not shown) to release the upper end 6a from the container 2. The upper end 6a is then moved back from the container 2 and the lower end 6b engages a fixed element attached to the ship which holds the equipment 1 in a near vertical manner where it can be safely left. A secondary locking mechanism is provided for extra security and safety by preventing the equipment from moving.

The present invention at least in a preferred embodiment therefore includes a multi-lifting process including: a process for attaching the hardware to a stack of containers that will be lifted as a group from the ship; a process of lifting a stack of containers from the ship; a process of carrying this assembly to another location; a process for storing such an assembly; a process for removing the hardware from the stack of containers; a process for attaching the hardware to a stack of containers before loading it to a ship; a process for loading a stack of containers with hardware attached onto a ship; and a process for connecting and tensioning the stack of containers to the ship.

In a further variation, the equipment may also be lowered from the vertical position to the deck. A variety of mechanical aides including pneumatic, hydraulic, block and tackle and spring counterbalancing (not shown) may be used to perform this step thus removing most of the effort of the process. The lower end 6b is constrained to prevent unwanted movement while the equipment is lowered.

The equipment is also provided with a means of telescoping the components together to facilitate compact storage both in the horizontal and vertical methods.

The preferred embodiments provide a lashing process significantly faster on both the discharge and load cycles than existing lashing systems. It is faster because it substantially eliminates much of the current physical work; allows use of equipment to reduce the load of the remaining work; transfers some of the remaining work off the ship thus no longer affects the ship work cycle.

The equipment and process of a preferred embodiment is designed to remove most of the physical effort of lashing and unlashing containers. Workers guide the bars 6 into place but the load is carried by the equipment. This reduces load, improves safety and increases processing speed. The lashing is designed to remain together in a safe assembly (harness) 1. Conventional lashing handled this way represents a great danger of bars 6 falling. By keeping the components together the majority of the work (and danger) of assembling and dismantling the lashing is removed. Use of equipment and the inherently safer design requires only one worker. The design does not require turning of turnbuckles thus the lashing can be located closer to the container 2 face meaning less intrusion to walkways on a deck of a ship. Combined with the lower workload and easier task it would be possible to make the spacing between containers smaller with greater safety. The system does not require workers to be close to the container 2 face thus issues of working "leaning in" are removed. Lashing is mechanically removed from the deck once released. This eliminates clutter and allows the lashing to be maintained in a suitable environment with proper equipment, better ergonomics and a ready supply of spares. Because there is almost no difference in the amount of labour and time for single or double lashing the ship would routinely be double lashed. This decreases variability and is inherently safer as it eliminates the task of adding lashing at sea and of managing extra bars to the deck when in port.

The whole task of tensioning is significantly lightened by use of a tensioning mechanism 60 in conjunction with a mechanised device that tensions the rigging to a known standard and records its results for assurance purposes. This is best seen in FIGS. 15, 16a, 16b, 17a and 17b. The tensioning device 60 of an embodiment incorporates an automatic locking device to prevent loosening of the thread. The tensioning device is quickly and readily used at sea to retension and to record the fact and results. The device 60 is not subject to "thread locking" and removes the need for prise bars. Each harness 1 is identified individually thus allowing for a service-based maintenance regime. Use of proper equipment in the maintenance work allows "suspect" equipment to be removed from service or repaired before it causes a failure in the field. The adjusters 10 are maintained and relubricated under controlled conditions ensuring that sufficient but not excessive lubrication is applied. As the bars 6 remain vertical between "hanging" on the container 2 and being connected to the deck and tensioned, it is possible to have lashing workers work safely and efficiently in close proximity to each other. On the other hand the huge reduction in the actual task means that a single worker can do the work of 6-8 thus the need for more labour is removed. In one embodiment there is included a retainer (not shown) feature whereby the lashing will not "fall" out of the corner casting when hung.

Figure 15:
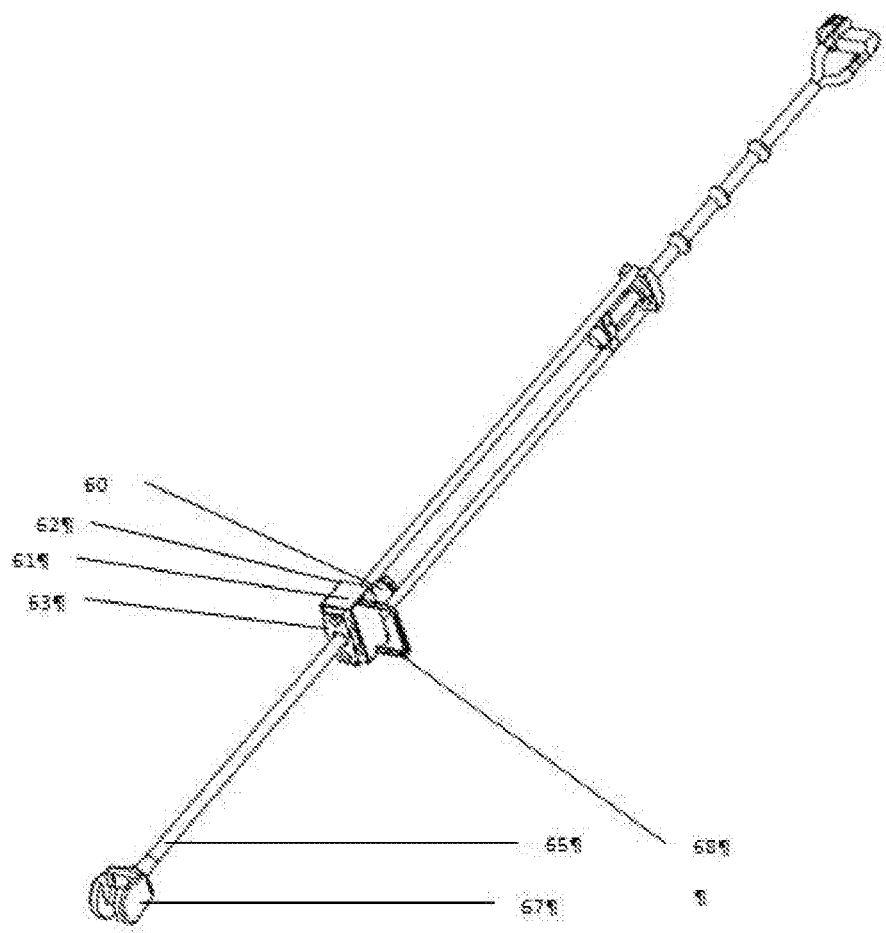
FIG. 15 shows an embodiment of a tension relieving device.

FIG. 15 shows an alternative embodiment in which the adjustment means is aligned with the main rod 6. This means includes another attachment means 67 which allows a quick connect to a pivoting bolt or fixture (not shown) which is attached to a standard deck fitting (not shown)

Although all activities may be performed manually a critical element of the system is the use of the adjustment means 10 to quickly and efficiently adjust the assembly 1 and at the same time record the successful (or otherwise) tensioning of the assembly 1 and communicate this information to others for the purpose of (amongst others) assurance of task completeness and correct tension.

In the embodiment with the adjustment means 10 integral and coaxial with the rod 6 the design overcomes "thread locking" by means of a detensioning mechanism 64 that allows sufficient movement to reduce the tension in the adjustment mechanism 10 a level where the adjustment can be performed with low effort.

Figure 10:
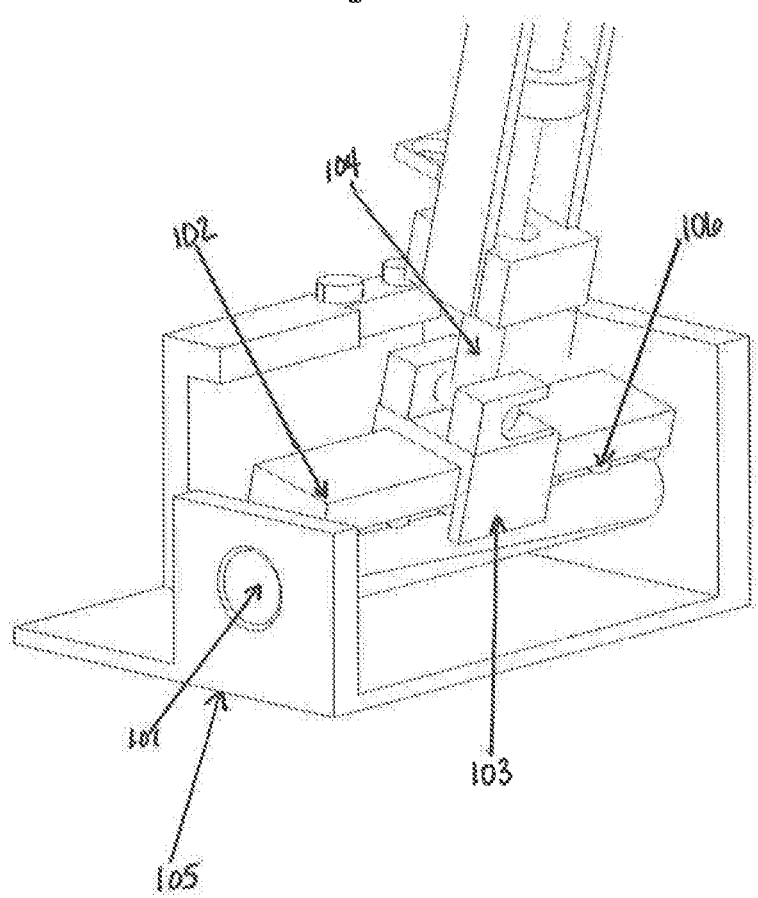
FIG. 10 is an embodiment of a securing mechanism with an integrated screw adjustment for tension.

In FIG. 10, the adjustment means consists of a base 105 to which is pivoted a track 102, to the track is attached a moveable carriage 103 which is attached to the lashing rod 104. The carriage 103 can be moved along the track 102 and positioned by engaging tooth 106 to remove most of the slack in the assembly (coarse adjust). The whole assembly may then be tensioned by use of the bolt 101 which forces the track 102 away from the rod 104 thus tensioning it (fine adjust).

Figure 11:
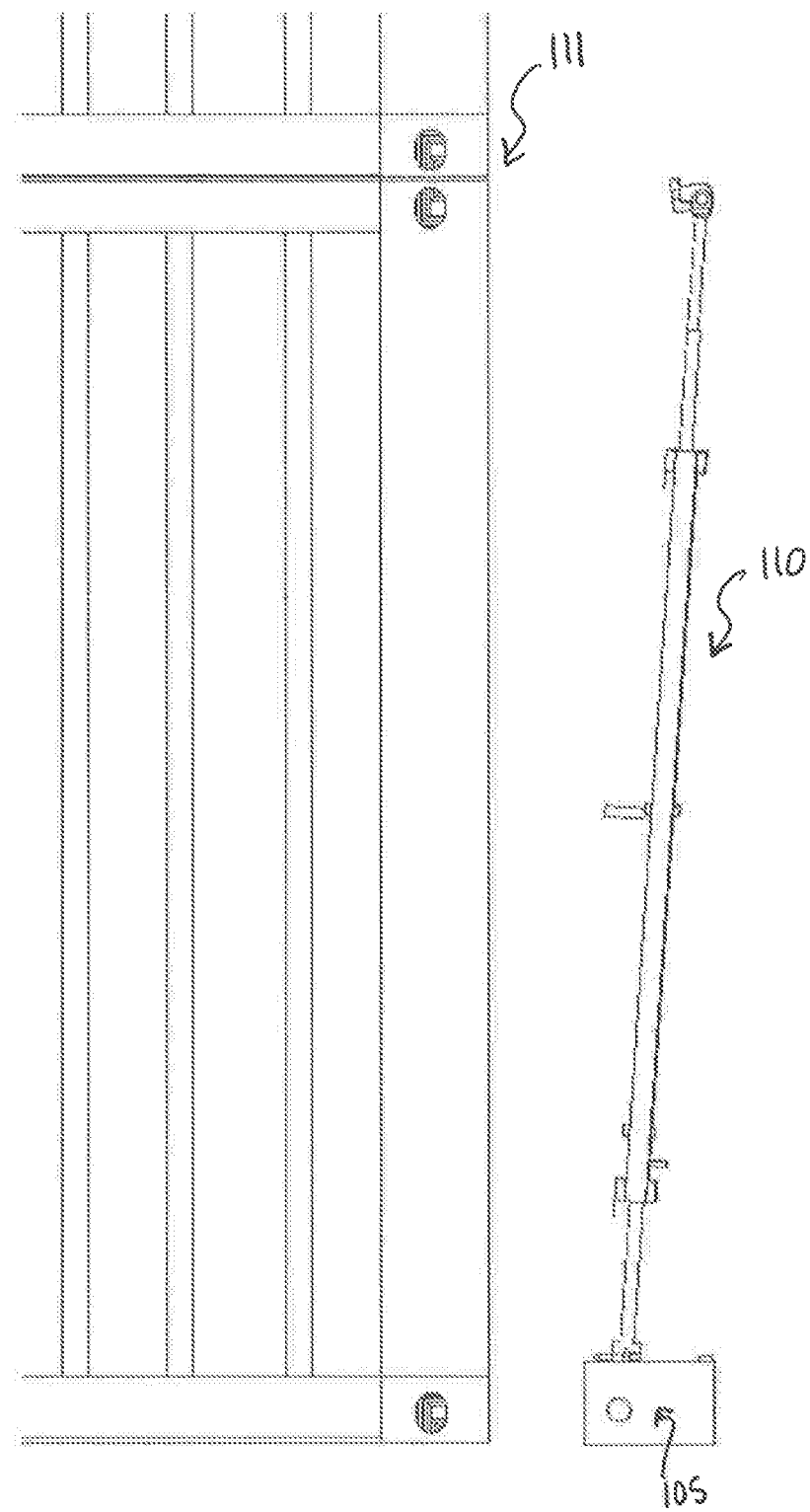
FIG. 11 is an embodiment of the securing assembly showing the rod in its "storage" position.

FIG. 11 shows the rod assembly 110 in the vertical storage position after it has been disengaged from the container 111. The assembly is locked into the base 105 to prevent undue movement during storage.

Figure 12A:
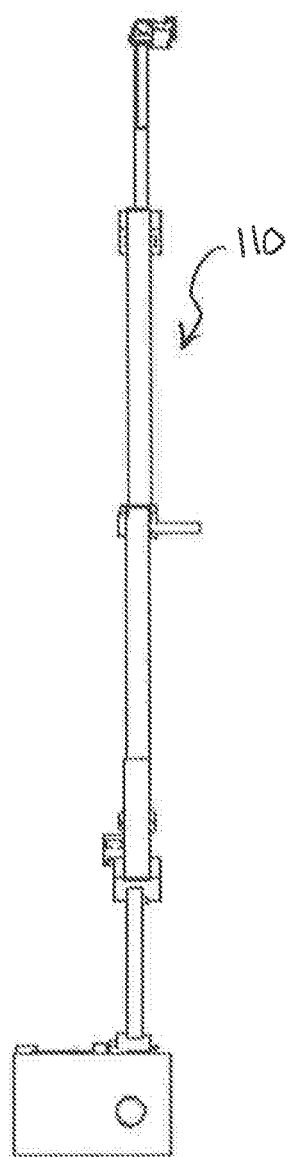
FIGS. 12a and 12b shows storage of the equipment in the vertical and horizontal position with the telescopic feature employed to reduce space required.

FIG. 12a shows the rod assembly in the position in which it rests when attached to the container (not shown in this view) 111.

Figure 12B:
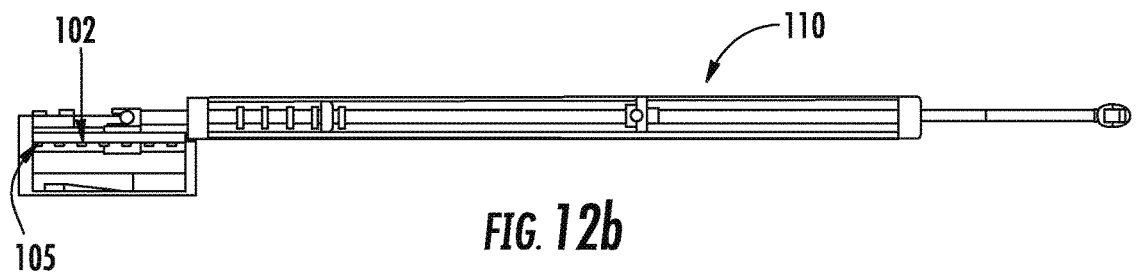

FIG. 12b shows the rod assembly 110 in the horizontal storage position where it is attached to the base 105 via the track 102.

Figure 13A:
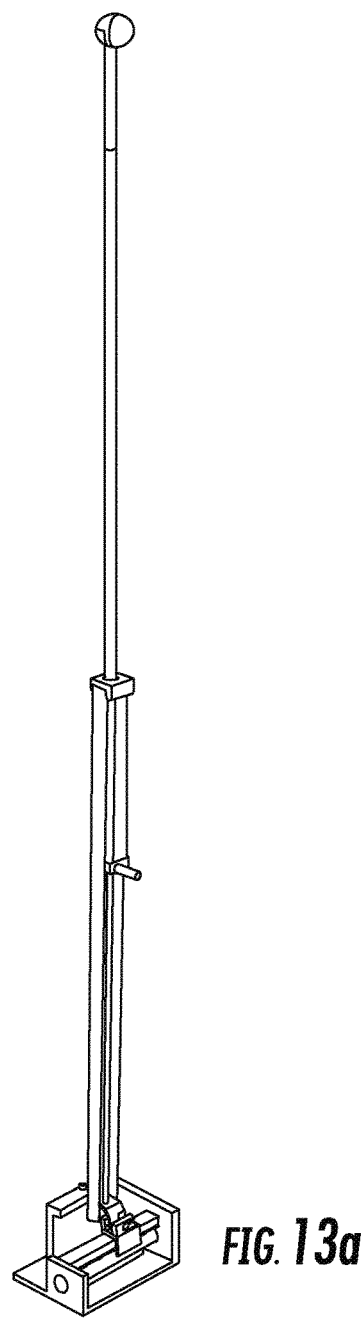
FIGS. 13a and 13b shows an embodiment of the securing rod with the threaded screw adjustment positioned to be coaxial and with a tension relieving device.
Figure 13B:
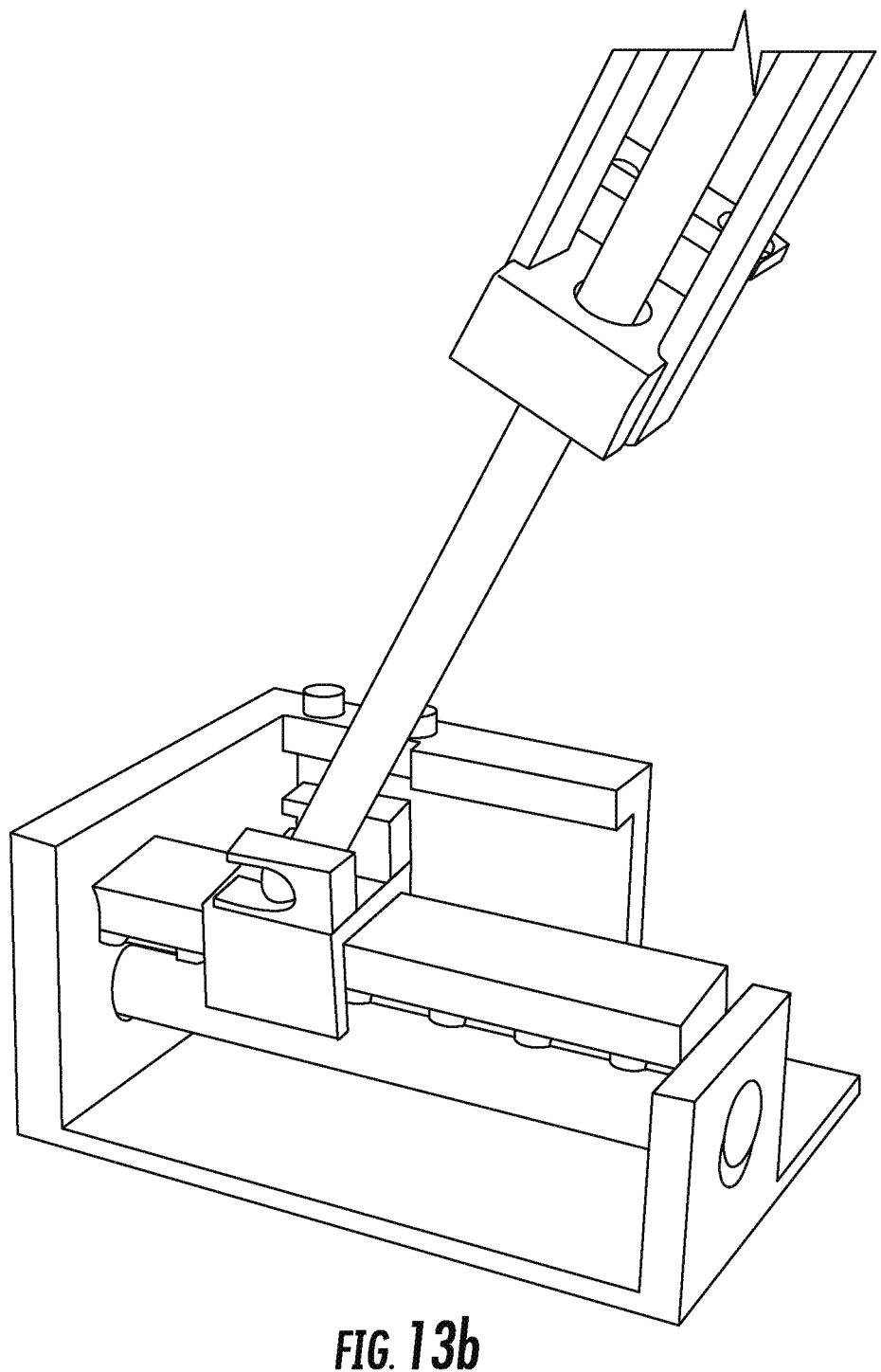

FIGS. 13a and 13b shows an alternative embodiment in which the adjustment means is aligned with the main rod. This means includes another attachment means 67 which allows a quick connect to a pivoting bolt or fixture which is attached to a standard deck fitting (not shown).

Figure 14A:
FIGS. 14a and 14b shows an embodiment of a tension relieving device making use of a 2 bar mechanism.
Figure 14B:
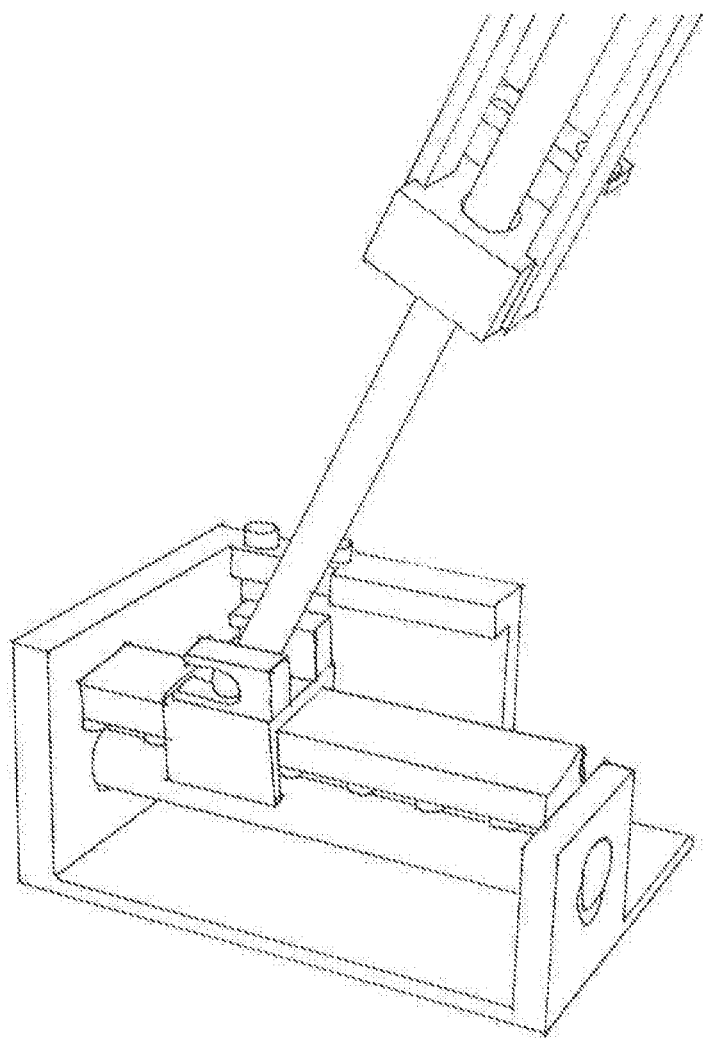

The assembly 110 includes a fine adjustment nut 60 which is used to tension the assembly by the threaded portion of the rod 65. 68 is a handle for operating the quick release mechanism contained within the housing 61. Within the housing 61 are two plates 62 and 63 which are kept apart by a mechanism (see FIGS. 14a, 14b and 15) that when operated removes the tension from the assembly.

Figure 16A:
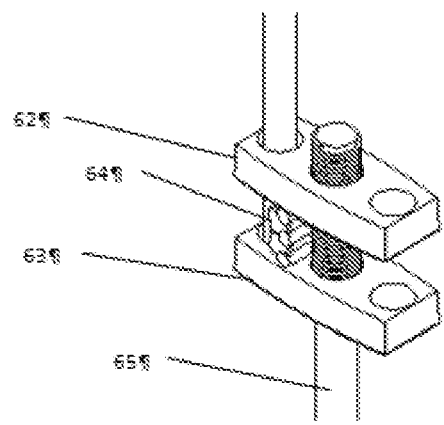
FIGS. 16a and 16b shows an alternate embodiment of the invention.
Figure 16B:
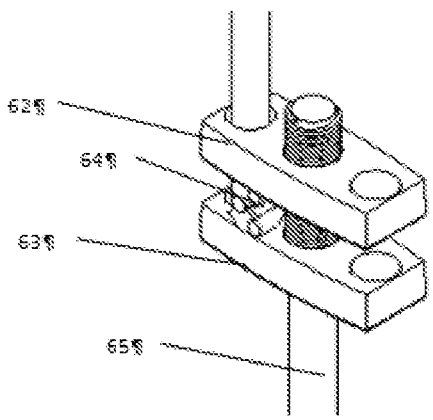

FIGS. 15, 16a, and 16b show a 4 bar mechanism that allows the rod 6 to be detensioned by means of a collapsing linkage 64 operated by a lever 68 which allows plates 62 and 63 to move towards each other thus reducing the tension and allowing the main adjustment means 10 to be operated without undue force.

Figure 17A:
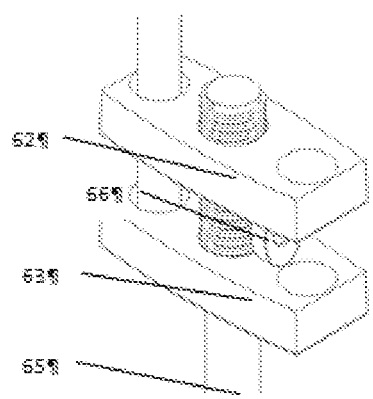
FIGS. 17a and 17b shows an alternate embodiment of the invention.
Figure 17B:
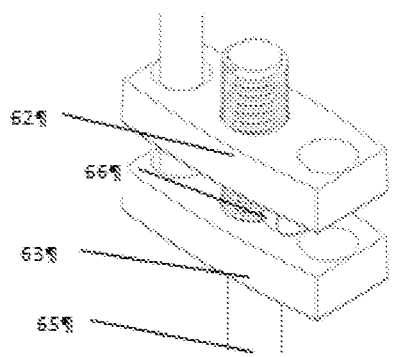

FIGS. 17a and 17b show an alternate mechanism to that of FIG. 15 in which a cam 66 is used to provide the same function. Here the cam arrangement 66 is actuated by the handle 68 to allow the plates 63, 62 to move together under force and thus reduce the tension in the overall assembly 110.

Use of lightweight high tensile materials to reduce weight can also be utilised. Otherwise the components are manufactured of steel. Although the invention has been described with reference to specific examples, for example shipping and shipping containers, it will be appreciated by those skilled in the art that the invention may be embodied in many other forms.

The invention claimed is:

1. A securing assembly adapted to secure one or more shipping containers to a container ship, the assembly including:
    attachment means for attaching said assembly to structure of the container ship in use;
    an elongate rod, the rod having a first end and a second end, the first end connectable to the attachment means, the second end connectable to an adjustment means for adjusting a length of said elongate rod, and said second end including a threaded portion, said threaded portion operatively associated with a corresponding threaded portion on said adjustment means to adjust the length of said rod and thereby change tension in the assembly;
    a base adapted to connect said adjustment means to said structure of the container ship via said elongate rod and said attachment means in use; and
    a manually-operated detensioning mechanism configured with said adjustment means, said detensioning mechanism comprising plates that move together upon manual actuation of the detensioning mechanism resulting in automatic relief of said tension in the assembly.

2. A securing assembly according to claim 1, wherein said adjustment means includes a pair of arms, said detensioning mechanism bridging between said pair of arms at an end of said pair of arms adjacent said attachment means.

3. A securing assembly according to claim 1, wherein said base includes a slide mechanism to permit said base to be moved about said structure.

4. A securing assembly according to claim 3, wherein said slide mechanism includes a slide moveable along a track securable on said structure.

5. A securing assembly according to claim 1, wherein said base includes a lock to lock said base in a position on said structure.

6. A securing assembly according to claim 5, wherein said lock includes a pin.

7. A securing assembly according to claim 1, wherein said base is disconnectable from said structure.

8. A securing assembly according to claim 1, wherein said base is adapted to move a lower section of the rod at an angle to an object to tension the elongate rod.

9. A securing assembly according to claim 1, wherein said base is adapted to attach to one or more existing fittings of the structure.

10. A securing assembly according to claim 1, wherein said rod is adapted to remain attached to said adjustment means.

11. A securing assembly according to claim 1, wherein said adjustment means includes a sliding element having a thread.

12. A securing assembly according to claim 1, wherein said adjustment means can be operated manually or by way of an automatic adjusting device.

13. A securing assembly according to claim 1, wherein said adjustment means is loadable to a pre-determined tension.

14. A securing assembly according to claim 13, wherein said adjustment means includes sensors to confirm whether adjustment has been achieved and at what tension.

15. A securing assembly according to claim 2, wherein said adjusting means comprises a nut engaged with a threaded portion of said elongate rod that extends through said plates.

16. A securing assembly according to claim 15, wherein said manually-operated detensioning mechanism comprises a housing, said plates configured within said housing, and a spacer member operably configured between said plates that maintains a space between said plates in an un-actuated position of said detensioning mechanism, said spacer member reconfiguring upon manual actuation of said detensioning mechanism to reduce said space between said plates such that said plates move together and automatically relieve said tension in the assembly.

17. A securing assembly according to claim 16, wherein said member between said plates comprises a collapsible linkage.

18. A securing assembly according to claim 16, wherein said detensioning mechanism further comprises a manually-actuated handle configured with said member.

19. A securing assembly according to claim 16, wherein said member between said plates comprises a cam.

* * * * *